(12) United States Patent
Wolf et al.

(10) Patent No.: US 10,676,140 B2
(45) Date of Patent: Jun. 9, 2020

(54) REAR DIFFUSOR UNIT WITH A FLOW-DIRECTING SEALING ELEMENT

(71) Applicant: Dr. Ing. h.c. F. Porsche Aktiengesellschaft, Stuttgart (DE)

(72) Inventors: Thomas Wolf, Leonberg (DE); Markus Keller, Leonberg (DE); Sven Wallrabe, Leonberg (DE); Dominik Beierl, Korntal-Muenchingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 72 days.

(21) Appl. No.: 15/963,130

(22) Filed: Apr. 26, 2018

(65) Prior Publication Data
US 2019/0009841 A1    Jan. 10, 2019

(30) Foreign Application Priority Data
Jul. 4, 2017   (DE) ........................ 10 2017 114 863

(51) Int. Cl.
| | |
|---|---|
| *B62D 35/00* | (2006.01) |
| *B60R 13/06* | (2006.01) |
| *B62D 37/02* | (2006.01) |
| *B62D 35/02* | (2006.01) |

(52) U.S. Cl.
CPC ............ *B62D 35/007* (2013.01); *B60R 13/06* (2013.01); *B62D 37/02* (2013.01); *B62D 35/02* (2013.01)

(58) Field of Classification Search
CPC ...... B62D 35/007; B62D 35/02; B62D 37/02; B60R 13/06
USPC ................................ 296/180.1, 180.5, 181.5
See application file for complete search history.

(56) References Cited

U.S. PATENT DOCUMENTS

| | | | | |
|---|---|---|---|---|
| 6,575,522 | B2 * | 6/2003 | Borghi ................. | B62D 35/005 296/180.5 |
| 8,731,781 | B2 * | 5/2014 | Prentice ................ | B62D 35/02 701/49 |
| 8,882,176 | B2 * | 11/2014 | Froling ................. | B62D 35/02 296/180.1 |
| 9,561,827 | B2 * | 2/2017 | Parry-Williams ...... | B62D 37/02 |
| 2009/0286460 | A1 | 11/2009 | Molnar et al. | |
| 2015/0353148 | A1 | 12/2015 | Wolf | |

FOREIGN PATENT DOCUMENTS

| | | |
|---|---|---|
| DE | 102008024896 A1 | 11/2009 |
| DE | 102011103787 A1 | 12/2012 |
| DE | 102012211774 A1 | 1/2014 |
| DE | 102013105842 A1 | 12/2014 |

* cited by examiner

*Primary Examiner* — Jason S Morrow
*Assistant Examiner* — E Turner Hicks
(74) *Attorney, Agent, or Firm* — Leydig, Voit & Mayer, Ltd.

(57) ABSTRACT

A rear diffusor unit includes a base element configured to be mounted in a fixed position on a body of a vehicle; a movable diffusor element; and a drive device with which the movable diffusor element is movable relative to the base element between two end positions. The diffusor element is a box diffusor element having two fixed side walls, a fixed rear wall, and a fixed base.

14 Claims, 5 Drawing Sheets

REAR DIFFUSOR UNIT WITH A FLOW-DIRECTING SEALING ELEMENT

CROSS REFERENCE TO RELATED APPLICATIONS

This application claims benefit to German Patent Application No. DE 10 2017 114 863.9, filed Jul. 4, 2017, which is hereby incorporated by reference herein.

FIELD

The present invention relates to a rear diffusor unit having a movable diffusor element and to a vehicle with such a rear diffusor unit.

BACKGROUND

A rear diffusor is an aerodynamic element on the lower side of a vehicle body in the region of a rear of a vehicle. The rear diffusor is customarily movable here in such a manner that its angle and/or its distance with respect to a carriageway surface can be changed. As a result, a force is exerted on the vehicle by means of an airflow which flows on a lower side of the vehicle. It is therefore possible, by means of the rear diffusor, to influence the driving performance of the motor vehicle in respect of the vehicle down force and the aerodynamic drag.

In this connection, a vehicle with an air-directing device is known, for example, from DE 10 2011 103 787 A1. On a lower-side rear region at the rear behind the rear wheels, the vehicle comprises a body-mounted base. The air-directing device is fastened to the body-mounted base and comprises a directing element which extends in the transverse direction of the vehicle and is adjustable between an inoperative position and an operating position by means of an actuating mechanism.

Furthermore, DE 10 2013 105 842 A1 discloses a particularly advantageous motor vehicle with a rear diffusor. A diffusor is arranged at the rear of the motor vehicle in the region of the underbody, the diffusor having a front fixed diffusor part of the underbody and an adjoining, downwardly foldable rear diffusor end part of the underbody. The diffusor end part can also be composed of a separate element and placed onto the underbody. By displacement of said diffusor end part into an upwardly folded position and into a downwardly folded position, down force/lift effects and aerodynamic drag effects are appropriately obtained.

SUMMARY

In an embodiment, the present invention provides a rear diffusor unit. The rear diffuser unit includes a base element configured to be mounted in a fixed position on a body of a vehicle; a movable diffusor element; and a drive device with which the movable diffusor element is movable relative to the base element between two end positions. The diffusor element is a box diffusor element having two fixed side walls, a fixed rear wall, and a fixed base.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
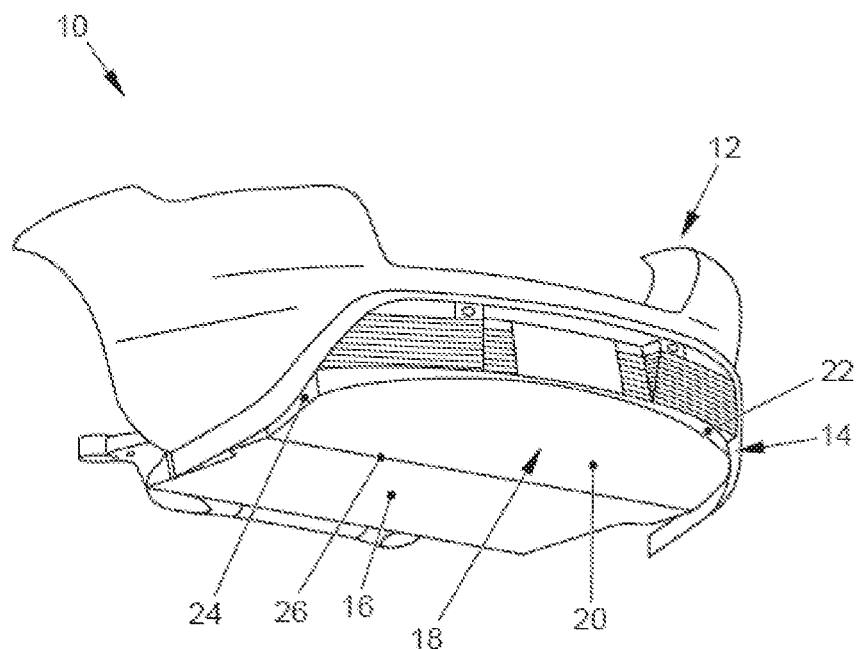
FIG. 1 shows a perspective illustration of a rear of a vehicle with a rear diffusor unit according to a first preferred embodiment with the diffusor element retracted, in a view obliquely from below.

Embodiments of the present invention provide a rear diffusor unit and a vehicle having a rear diffuser unit that permit a reduction in frictional losses and improved ground adhesion during driving and that can be realized in a simple manner.

According to one or more embodiments of the invention, rear diffusor units are specified, comprising a base element which can be mounted in a fixed position on a body of a vehicle, a movable diffusor element, and a drive device with which the diffusor element is movable relative to the base element between two end positions, wherein the rear diffusor unit has a flow-directing sealing element which forms a fluidic seal between the base element and the diffusor element. According to one or more embodiments of the invention, vehicles with such a rear diffusor unit is furthermore specified.

One or more embodiments of the present invention provide a rear diffuser unit that provides for a particularly good fluidic transition between the base element and the diffusor element by a gap which arises between the base element and the diffusor element being closed with the sealing element. This results in improved conduction of air in the region of the rear diffusor unit, which improves the aerodynamic drag of the vehicle having said rear diffusor unit. As a result, the driving properties of the vehicle can be improved with little outlay. In addition, a reduced aerodynamic drag contributes to a reduced consumption of energy. The fuel consumption can therefore be reduced, for example, in the case of a vehicle with an internal combustion engine. Starting from a predetermined fuel store or a predetermined battery capacity, an action radius of the vehicle can also be improved.

The rear diffusor unit is an assembly which is typically mounted in a rear region of the vehicle on the lower side thereof. The base element is attached here to the vehicle, i.e. to the body thereof. The configuration and manner of attaching the base element can basically be selected freely here. The base element can form part of the body of the vehicle. Even if the base part and the diffusor element are provided as individual parts prior to installation, the rear diffusor unit is formed as a functional unit by means of the installation. In a corresponding manner, the sealing element can also be mounted separately. Preassembly of the rear diffusor unit prior to the installation in the vehicle is not required.

The diffusor element is movable relative to the base element and therefore to the body of the vehicle in order to influence driving properties of the vehicle, as indicated above, by adjustment of the diffusor element. This relates, for example, firstly to an increase in ground clearance of the vehicle, as is generally expedient in town when driving at typically low speeds. By means of the increase in the ground clearance of the vehicle, damage due to road damage, when parking on curbs or similar can often be avoided. The diffusor element here is in a retracted state. Secondly, the diffusor element can be transferred into an extended state. In the extended state, a distance between the diffusor element and a carriageway surface is reduced in comparison to the retracted state. This reduces the air friction, which ultimately also leads to a reduction in the consumption. In addition, down force can be produced at the rear of the vehicle, as a result of which the driving performance during accelerating and on bends (driving dynamics at high speeds) is additionally improved. Intermediate states between the retracted and the extended state are basically also possible.

The drive device brings about a movement of the diffusor element between the retracted and the extended state which here define end positions for the movement of the diffusor element. For this purpose, the drive device is firstly held on the diffusor element and secondly on the base part or directly on the body of the vehicle. According to an advantageous embodiment, the drive device is designed to pivot the diffusor element relative to the base part, wherein the pivot axis typically runs transversely with respect to the longitudinal direction of the vehicle and therefore transversely with respect to a direction of travel of the vehicle. Alternatively or additionally, the drive device can be designed to move the diffusor element relative to the base part in a different manner and/or to change the shape of the diffusor element, for example by extending the diffusor element or pushing same together.

The flow-directing sealing element can be designed differently, as explained by way of example below. A plurality of individual sealing elements can in principle also be arranged in such a manner that they jointly form the sealing element. The sealing element also brings about sealing of a lower side of the body of the vehicle in the transition region between the base part and the diffusor element. In addition to the improved flow of air, said sealing prevents moisture and dirt from being able to pass into the body.

In an advantageous refinement of the invention, the sealing element is designed as a flow-directing hinge element which pivotably connects the base element to the diffusor element. The sealing function can therefore be provided integrally with a holder of the diffusor element in the sealing element. An only partial configuration of the sealing element as a hinge element is basically also possible. Further directions of movement of the diffusor element relative to the base element are not restricted as a result.

In an advantageous refinement of the invention, the sealing element is designed as a film hinge. The film hinge is easy to produce, has a low weight and can be produced with basically any desired dimensions, in particular with basically any desired width. The film hinge provides good mobility, wherein the seal between the base element and the diffusor element is ensured at the same time.

In an advantageous refinement of the invention, the sealing element extends over at least 50% of an entire width of the diffusor element, preferably over at least 75% of the entire width of the diffusor element, furthermore preferably over at least 85% of the entire width of the diffusor element and particularly preferably over at least 90% of the entire width of the diffusor element. The wider the sealing element is designed to be, the greater is the reduction in the aerodynamic drag, and therefore basically as large a width as possible of the sealing element is preferred. However, for design reasons, it may be expedient for the base element and the diffusor element to have a pivot axis, for example at a transition therebetween, the pivot axis not extending, however, over the entire width of the diffusor element. The region of the common pivot axis can therefore be sealed with the sealing element.

In an advantageous refinement of the invention, the flow-directing sealing element is designed as an elastically deformable sealing element. By means of the deformability, the sealing element can particularly readily seal a gap between the base part and the diffusor element. In particular, a seal, which is simple to realize, between the base part and the diffusor element can thus be achieved. For example, the deformability of the sealing element can be used in order to have the effect, by means of forces, which occur during the driving, on the sealing element that the sealing element fits particularly readily into the gap between the base element and the diffusor element. In a further advantageous refinement of the invention, the flow-directing sealing element is designed as a rubber lip. The rubber lip is elastic, has a low weight, can be adapted to different designs and is also usable as a film hinge.

In an advantageous refinement of the invention, the flow-directing sealing element has a multipart design with at least two elastically deformable elements and at least one non-deformable element arranged in between. The elastically deformable elements and the at least one non-deformable element are arranged consecutively in the longitudinal direction of the vehicle. Such a design of the sealing element permits a substantial adaptation to vehicle dimensions. In addition, the elastically deformable elements can realize any desired mobility of the sealing element, as a result of which a large amount of degrees of freedom arise for the configuration of the rear of the vehicle.

In an advantageous refinement of the invention, the diffusor element is designed as a box diffusor element which has two fixed side walls, a fixed rear wall and a fixed base. The box diffusor element results in the formation of a particularly stable diffusor element. The box shape of the diffusor element is aerodynamically advantageous since no leakage flows and no backflow occur. The aerodynamic drag of the vehicle is thereby further improved. In addition, in comparison to other diffuser elements, the box diffuser element has a substantially simpler design. Complex flexible folding walls or the like can therefore be omitted.

In an advantageous refinement of the invention, the diffuser element has a U-shaped basic shape, and the sealing element is arranged on the diffuser element on an inner side of a connecting region between the side limbs of said diffuser element. The U-shaped basic shape relates to a shape in a plane substantially parallel to a carriageway. Such a configuration may be advantageous, for example, in order to take into account space requirements in the rear region of the vehicle and at the same time to be able to provide as large a rear diffuser as possible.

In an advantageous refinement of the invention, the diffuser element is pivotable along the inner side of the connecting region between the side limbs. The inner side of the connecting region between the side limbs therefore forms a pivot axis, along which the diffuser element is pivotable on the base part. The pivot axis typically runs transversely with respect to the longitudinal direction of the vehicle and therefore transversely with respect to a direction of travel of the vehicle.

FIGS. 1 to 5 relate to a vehicle 10 which has a rear diffuser unit 14 according to an embodiment of the invention in its rear 12. The rear diffuser unit 14 comprises a base element 16 which is mounted in a fixed position on a body of the vehicle 10, and a movable diffuser element 18. The base element 16 is attached here to the vehicle 10, i.e. to the body thereof. In this exemplary embodiment, the diffuser element 18 is designed as a box diffuser element which has a fixed base 20, a fixed rear wall 22 and two fixed side walls 24.

Furthermore, the rear diffuser unit 14 comprises a flow-directing sealing element 26 which forms a fluidic seal between the base element 16 and the diffuser element 18. The sealing element 26 of the first embodiment is designed as an elastically deformable sealing element 26 which forms a film hinge and pivotably connects the base element 16 to the diffuser element 18. The sealing element 26 extends substantially over an entire width of the diffuser element 18 and seals a gap between the base element 16 and the diffuser element 18 over the entire length thereof.

The rear diffuser unit 14 furthermore comprises a drive device 28 with which the diffuser element 18 is pivotable relative to the base element 16, and therefore to the body of the vehicle 10, between two end positions. For this purpose, the drive device 28 is firstly held via a bearing element 44 on the diffuser element 18 and secondly on the body of the vehicle 10. The mounting is illustrated in detail in FIG. 5.

Figure 2:
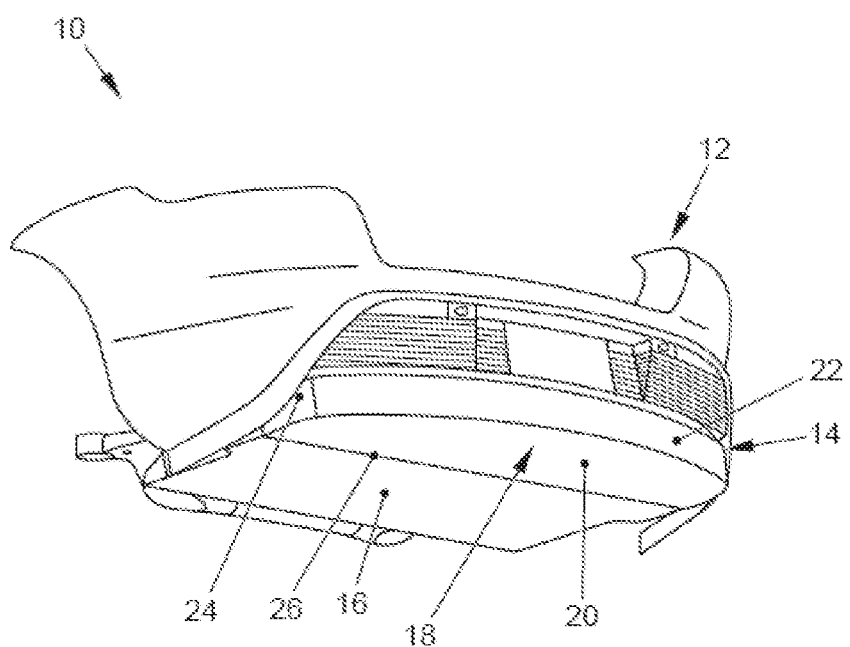
FIG. 2 shows a perspective illustration of the rear of the vehicle with the rear diffusor unit according to the first embodiment, with the diffusor element extended, in a view obliquely from below.
Figure 3:
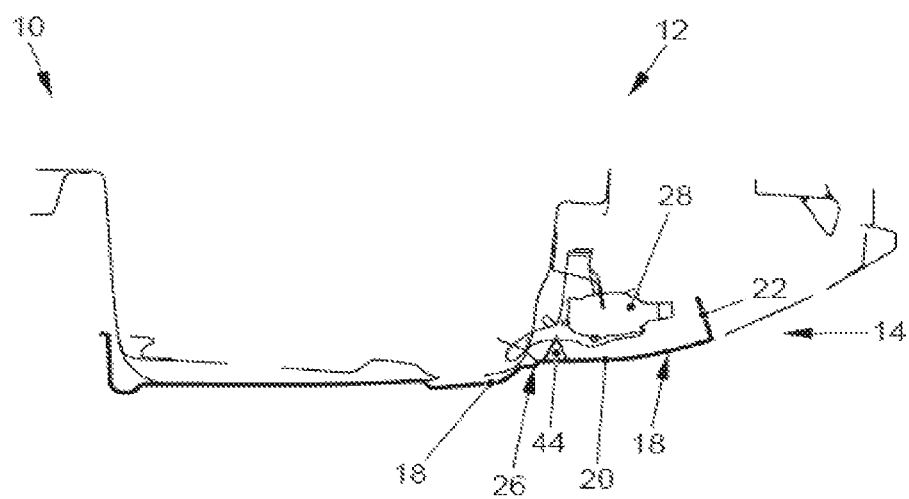
FIG. 3 shows a schematic lateral sectional view of the rear of the vehicle with the rear diffusor unit according to the first embodiment, with the diffusor element retracted.
Figure 4:
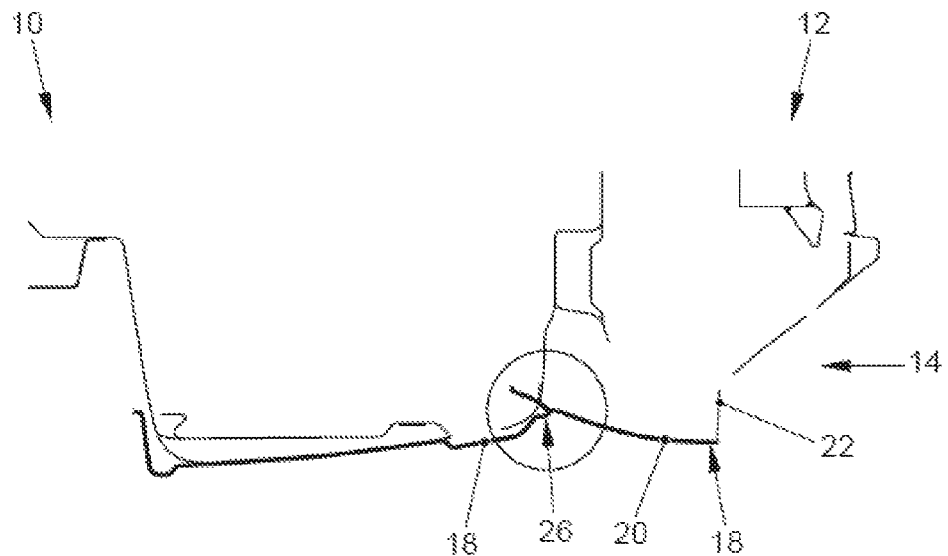
FIG. 4 shows a schematic lateral sectional view of the rear of the vehicle with the rear diffusor unit according to the first embodiment, with the diffusor element extended.
Figure 5:
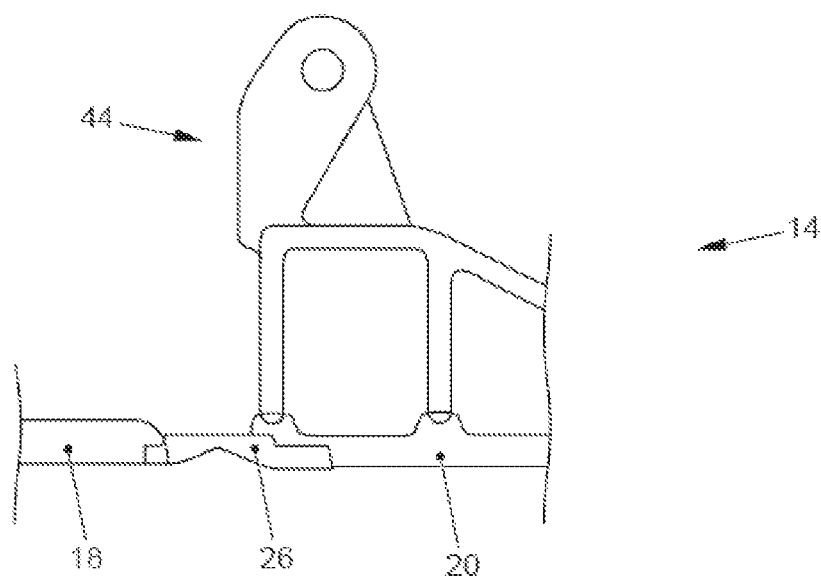
FIG. 5 shows a schematic lateral detailed view from FIG. 4 which shows the rear diffusor unit in the region of a transition between base element and diffusor element with sealing element.
Figure 9:
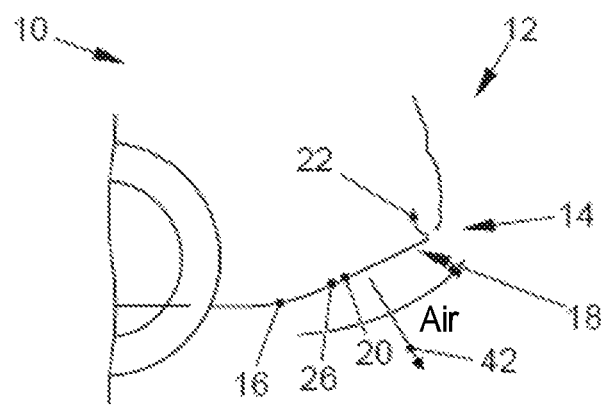
FIG. 9 shows a schematic diagram with a schematic lateral sectional view of the rear of the vehicle with a rear diffusor unit, with the diffusor element retracted and forces occurring during driving.

FIGS. 1 and 3 show the diffuser element 18 in a retracted state, while FIGS. 2 and 4 show the diffuser element 18 in an extended state. As emerges from the schematic illustration in FIG. 9, an airflow in the retracted state forms a resulting overall force 42 which is directed obliquely rearward. This results in a force component downward, which generates down force at the rear of the vehicle 10, and in a force component rearward, which therefore decelerates the vehicle 10.

Figure 10:
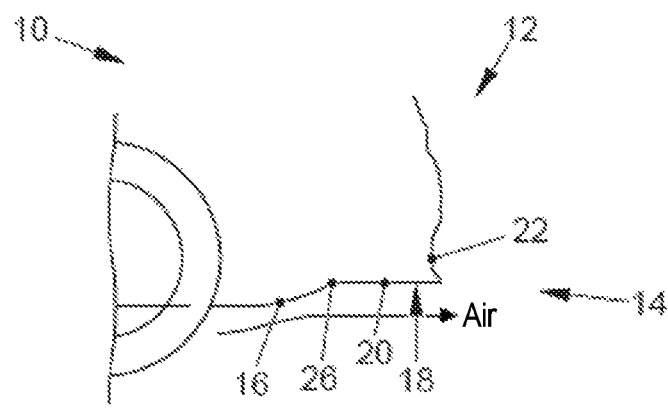
FIG. 10 shows a schematic diagram with a schematic lateral sectional view of the rear of the vehicle with a rear diffusor unit, with the diffusor element extended and the airflow occurring during driving.

As results from the schematic illustration in FIG. 10, in the extended state a distance between the diffuser element 18 and a carriageway surface is reduced in comparison to the retracted state. An airflow flows straight past the diffuser element 18, and therefore substantially (no) force is produced and, as a result, the aerodynamic drag of the vehicle is reduced.

Figure 6:
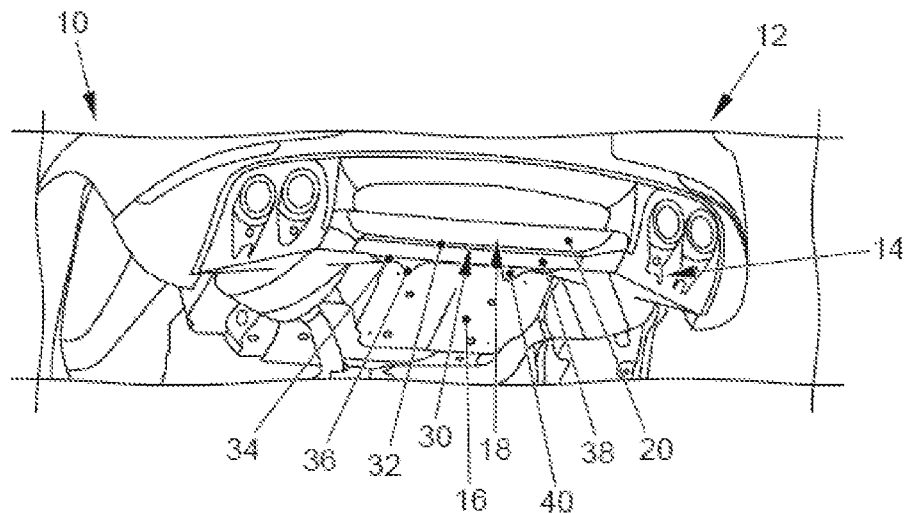
FIG. 6 shows a perspective illustration of a rear of a vehicle with a rear diffusor unit according to a second embodiment, with the diffusor element retracted, in a view obliquely from below.
Figure 7:
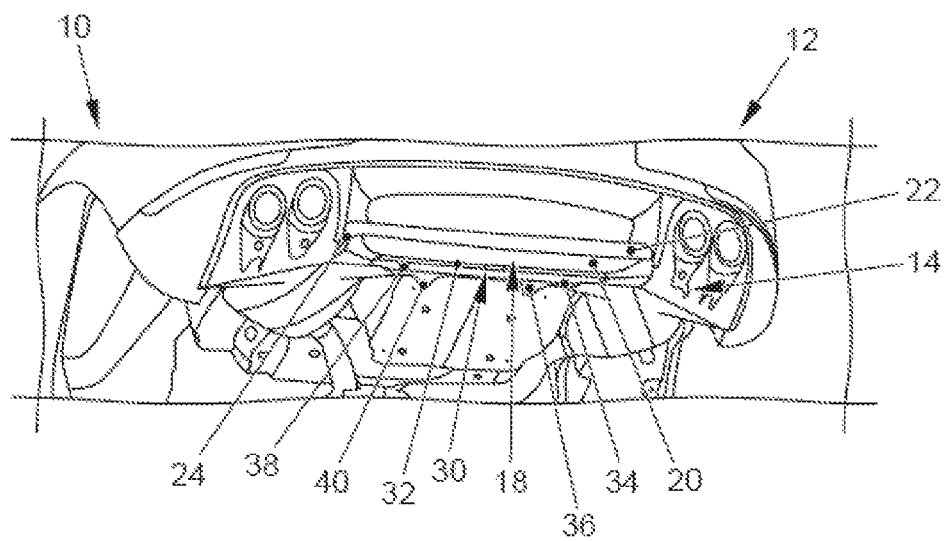
FIG. 7 shows a perspective illustration of the rear of the vehicle with the rear diffusor unit according to the second embodiment, with the diffusor element extended, in a view obliquely from below.
Figure 8:
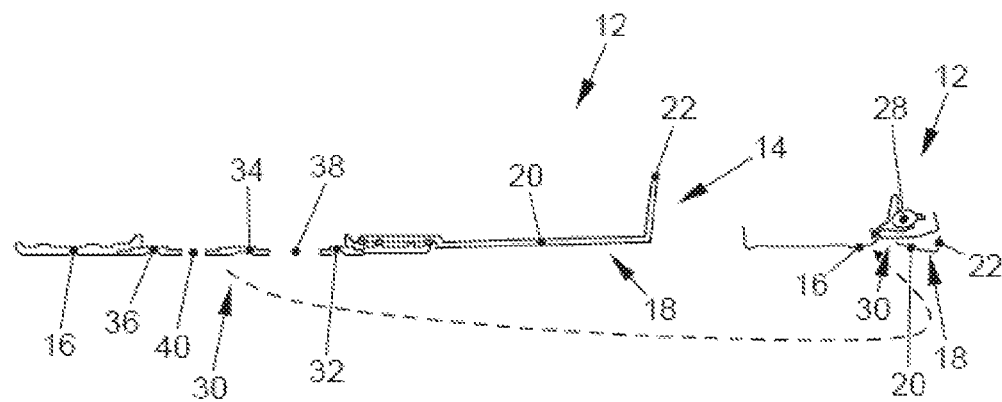
FIG. 8 shows a schematic lateral sectional view of the rear of the vehicle with the rear diffusor unit according to the second embodiment, with the diffusor element extended.

FIGS. 6 to 8 relate to a vehicle 10 with a rear diffuser unit 14 according to a second embodiment. The vehicle 10 and the rear diffuser unit 14 are of identical or similar design in substantial aspects, and therefore only differences between the two embodiments will be discussed here. Features of the second embodiment that are not explicitly described correspond to those of the first embodiment.

The rear diffuser unit 14 of the second embodiment likewise comprises a base element 16 which is mounted in a fixed position on a body of the vehicle 10, and a movable diffuser element 18 which is attached to a body of the vehicle 10. The diffuser element 18 of the second embodiment is also designed as a box diffuser element which has a fixed base 20, a fixed rear wall 22 and two fixed side walls 24.

According to the second embodiment, the diffuser element 18 has a U-shaped basic shape, and the sealing element is arranged on the diffuser element on an inner side of a connecting region between the side limbs of said diffuser element. The diffuser element 18 is pivotable along said inner side, as has been explained above with regard to the first embodiment, wherein the inner side of the connecting region forms a pivot axis, along which the diffuser element 18 is pivotable on the base part 16.

In addition, the rear diffuser unit 14 of the second embodiment comprises a multipart sealing element 30. The sealing element 30 correspondingly has a multipart design with a first, second and third elastically deformable element 32, 34, 36 and a first and second non-deformable element 38, 40. The elastically deformable elements 32, 34, 36 and the first and second non-deformable element 38, 40 are arranged consecutively in an alternating manner in the longitudinal direction of the vehicle 10. The function of the sealing element 30 of the second embodiment corresponds to that of the sealing element 26 of the first embodiment.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A rear diffuser unit, comprising:
  a base element configured to be mounted in a fixed position on a body of a vehicle;
  a movable diffuser element;

a flow-directing sealing element connecting the base element to the movable diffusor element; and a drive device with which the movable diffusor element is movable relative to the base element between two end positions, wherein the diffusor element is a box diffusor element having two fixed side walls, a fixed rear wall, and a fixed base, the fixed side walls and the fixed rear wall extending away from the fixed base, and wherein the flow-directing sealing element is arranged on the movable diffusor element at a connecting region between the fixed side walls, the flow-directing sealing element forming a fluidic seal between the base element and the moveable diffusor element.

2. The rear diffusor unit as claimed in claim 1, wherein the flow-directing sealing element has a multipart design with at least two elastically deformable elements and at least one non-deformable element arranged in between.

3. The rear diffusor unit as claimed in claim 2, wherein the flow-directing sealing element is a film hinge.

4. The rear diffusor unit as claimed in claim 1, wherein the flow-directing sealing element extends over at least 50% of an entire width of the movable diffusor element.

5. The rear diffusor unit as claimed in claim 1, wherein the flow-directing sealing element is an elastically deformable sealing element.

6. The rear diffusor unit as claimed in claim 1, wherein the flow-directing sealing element is configured as a flow-directing hinge element which pivotably connects the base element to the diffusor element.

7. The rear diffusor unit as claimed in claim 1,
wherein the diffusor element has a U-shaped basic shape, and
wherein the flow-directing sealing element is arranged on the movable diffusor element on an inner side of the connecting region.

8. The rear diffusor unit as claimed in claim 7, wherein the diffusor element is pivotable along the inner side of the connecting region between the side walls.

9. A vehicle with a rear diffusor unit as claimed in claim 1.

10. The rear diffusor unit as claimed in claim 7,
wherein the fixed rear wall is arranged between the fixed side walls,
wherein the fixed rear wall is connected with the fixed side walls to form a continuous wall along a periphery of at least a curved portion the fixed base, and
wherein the fixed base extends continuously between inner facing sides of the continuous wall.

11. The rear diffusor unit as claimed in claim 1, wherein the connection region is at an edge of the fixed base that is facing the base element and that is opposite to a side of the diffusor element having the rear wall.

12. The rear diffusor unit as claimed in claim 9,
wherein the box diffusor element is rigid,
wherein the box diffusor element is configured to pivot along the connecting region, a pivot axis running transversely with respect to a longitudinal direction of the vehicle,
wherein the flow-directing sealing element is connected to the box diffusor element and the base element along the pivot axis, and
wherein the rear wall of the box diffusor element is configured to pivot out the body of the vehicle and configured to prevent backflow,
wherein the box diffusor element is configure to pivot with respect to the base element, the base element remaining fixed.

13. The rear diffusor unit as claimed in claim 12, wherein the two end positions respectively correspond to a retracted state of the box diffusor and an extended state of the box diffusor, the extended state of the box diffusor being configured to reduce a distance between the box diffusor and a carriage way surface as compared to the retracted state.

14. The rear diffusor unit as claimed in claim 1, wherein the flow-directing sealing element covers a gap between the movable diffuser element and the base element.

* * * * *